(12) United States Patent
Colucci et al.

(10) Patent No.: US 12,703,291 B2
(45) Date of Patent: Aug. 11, 2026

(54) IN-VEHICLE MECHANIZED PACKAGE RETRIEVAL

(71) Applicant: Amazon Technologies, Inc., Seattle, WA (US)

(72) Inventors: John Lewis Colucci, Austin, TX (US); Gabriel Greeley, Hollis, NH (US); John MacNeill, Acton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 406 days.

(21) Appl. No.: 18/202,551

(22) Filed: May 26, 2023

(65) Prior Publication Data

US 2024/0391375 A1 Nov. 28, 2024

(51) Int. Cl.
*B60P 1/64* (2006.01)

(52) U.S. Cl.
CPC ............. *B60P 1/649* (2013.01); *B60P 1/6436* (2013.01)

(58) Field of Classification Search
CPC ....................................................... B60P 1/649
See application file for complete search history.

(56) References Cited

U.S. PATENT DOCUMENTS 10,577,180 B1 * 3/2020 Mehta ....................... B07C 5/36
2016/0221768 A1 * 8/2016 Kadaba ..................... B60P 1/52
2019/0113935 A1 4/2019 Kuo et al.
2021/0032034 A1 * 2/2021 Kalouche ............... B25J 9/1612
2021/0387808 A1 * 12/2021 Kalouche ............. B65G 1/0485

FOREIGN PATENT DOCUMENTS

CN 117980188 B * 2/2025 ................ B60P 7/00
EP 3254893 A1 * 12/2017 ............... B65G 1/16

OTHER PUBLICATIONS

Application No. PCT/US2024/029813 , International Search Report and Written Opinion, Mailed On Sep. 9, 2024, 18 pages.
PCT/US2024/029813 , "Invitation to Pay Additional Fees and, Where Applicable, Protest Fee", Jul. 19, 2024, 13 pages.

* cited by examiner

*Primary Examiner* — Terrell H Matthews
(74) *Attorney, Agent, or Firm* — Kilpatrick Townsend & Stockton LLP

(57) ABSTRACT

A cargo area within a delivery vehicle can include a storage area storing items for destinations along a route. A staging area may be accessible from inside and outside of the cargo area. A dispenser within the cargo area may provide item transfer from the storage area and to the staging area. For example, the dispenser may include a carriage for aligning an extendable and retractable arm operable to transfer an item hanging from a channel onto the arm and from the arm to the staging area. A controller may access route information about proximity to a delivery destination, access item information about an item assigned for that delivery destination, and cause the dispenser to move the assigned item from the storage area to the staging area for making the assigned item accessible from outside the cargo area in response to the proximity to the delivery destination.

11 Claims, 7 Drawing Sheets

IN-VEHICLE MECHANIZED PACKAGE RETRIEVAL

BACKGROUND

Items can be delivered using postal services, courier services, or other similar services. However, prior to delivery, the items are typically sorted and packaged in a warehouse facility. The sorting and packaging of individual or grouped items can be a time intensive process and may involve upstream operations as well as similar or duplicative operations in later or final segments of a delivery supply chain. The items can be shipped to customers using traditional delivery methods; however, these delivery methods can be long and slow and can cause the items to be moved and handled frequently. Additionally, items that are being shipped to customers located in a similar area are often shipped separately and delivered to the customers using delivery vehicles with limited capacity.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples herein are directed to, among other things, systems and techniques relating to an item delivery system for moving items. In various embodiments, the item delivery system may be implemented within a delivery vehicle. A cargo area of the vehicle may include a storage area for items, as well as a bin or other staging area where items can be readily accessed from outside of the cargo area. A dispenser within the cargo area may move items from the storage area to the staging area. For example, in response to route information about proximity to a particular destination, the dispenser may access the storage area to retrieve an item assigned for delivery to that destination and deposit the item into the bin or other staging area. As a result, a delivery operator (e.g., which may be a human operator or a robotic and/or automated operator) may be able to reach into the bin or other staging area through a wall, a bay door, or other boundary of the vehicle or otherwise access the staging area to retrieve the item for individual delivery. This may allow the operator to access and deliver the item without expending time, cognitive energy, and/or physical exertion to enter the cargo area, move items within the cargo area, sort through items within the cargo area, exit the cargo area, and/or other tasks within the cargo area that may otherwise be associated with retrieving an assigned item for a particular delivery destination in other workflows.

Turning now to a particular example, in this example, the item delivery system can include an array of storage channels for supporting hanging items within the storage area. Items may be coupled with handles or hangers that are shaped so that one portion of the handle rests on internal ledges of the storage channel while another portion of the handle extends downward through a mouth of the storage channel toward the item. The dispenser can include a carriage that can move to align with a storage channel end in use. An arm from the carriage may extend into the storage channel and engage an item handle to withdraw the handle from the storage channel and onto the arm. Upon such extraction of the item from the storage channel, the carriage may relocate to another position at which the arm may operate further to deposit the item in a bin or other staging area for ease of retrieval from the vehicle for final delivery by the delivery operator to the destination.

Figure 1:
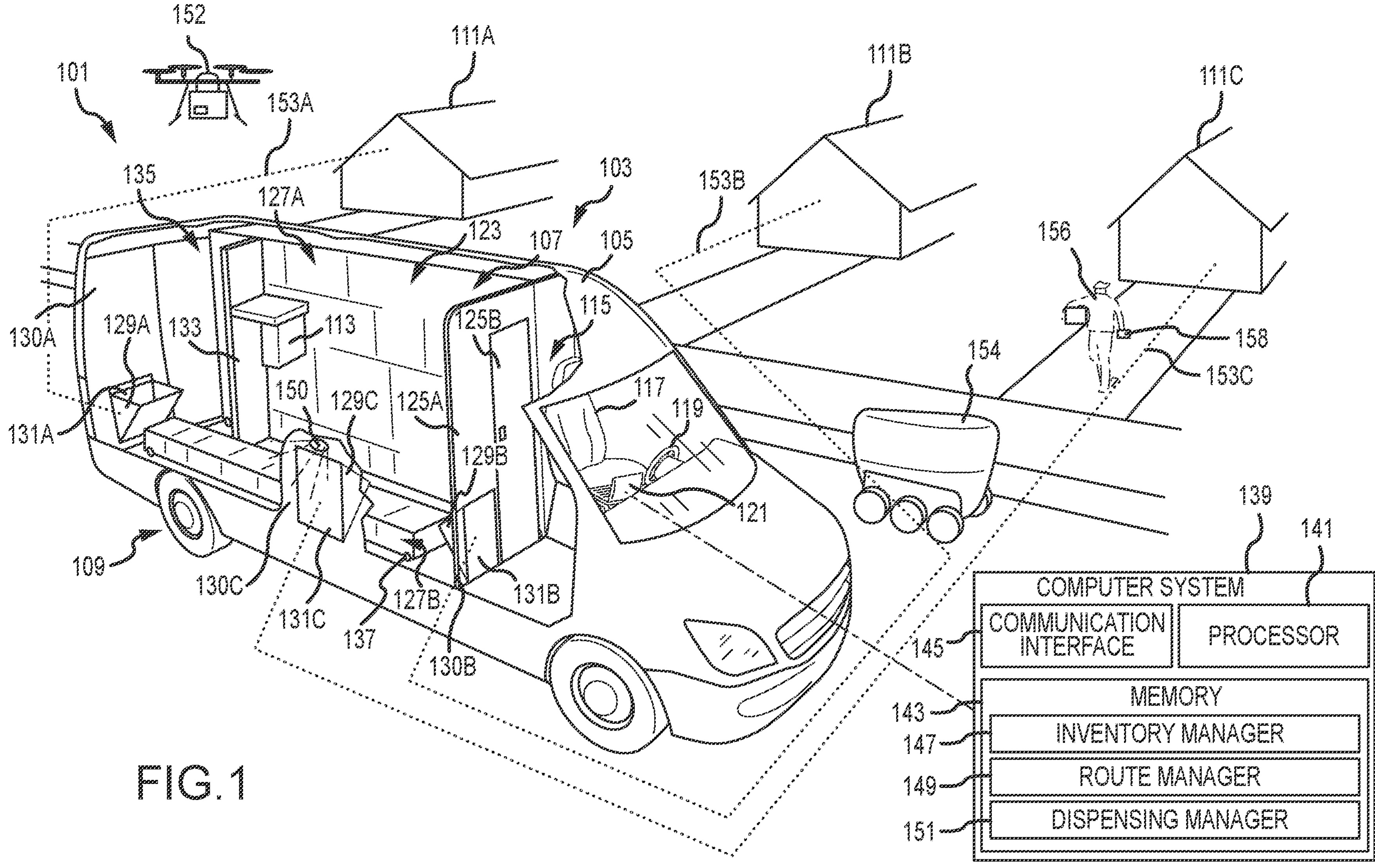
FIG. 1 illustrates a system for handling and/or delivery of items in accordance with various embodiments.

FIG. 1 illustrates a system 101. The system 101 can be, include, and/or be included in an item handling system and/or a delivery system.

The system 101 can include a delivery vehicle 103. The delivery vehicle 103 may correspond to a van, truck, or other form of vehicle. The vehicle 103 may include a vehicle body 105. The vehicle body 105 may include walls, windows, a roof, a floor, and/or any other panels or other members that define boundaries around an interior volume 107 of the vehicle 103.

The vehicle body 105 may be coupled with a propulsion system 109. The propulsion system 109 can include tires, a drivetrain, an engine, and/or any other suitable components to facilitate or enable movement of the vehicle body. The vehicle 103 may be moved by the propulsion system 109 among different destinations 111 along a route, for example. In FIG. 1, destinations 111 are depicted as residential houses and individually labeled as 111A, 111B, and 111C, although any number and/or type of destinations may be utilized, including, but not limited to houses, apartments, commercial buildings, or other suitable locations for receiving deliveries.

The delivery vehicle 103 may be suitably arranged for management and/or handling of items 113. For example, the items 113 may correspond to fulfillment of orders to be delivered to destinations 111 along the route. Although only a single item 113 is identified by reference number for ease of viewing in FIG. 1, any suitable number and/or variety of item types, sizes, and/or weights may be utilized.

The interior volume 107 of the vehicle 103 may include different regions or areas. The interior volume 107 may include a personnel area 115, for example. The personnel area 115 is depicted as including a personnel seat 117, a steering wheel 119 (or other steering apparatus), and a user interface 121, although any combination of these and/or other suitable features may be included. The personnel seat 117 may provide a suitable location for a worker to sit while riding in and/or driving the vehicle 103. The steering wheel 119 may be used to control at least some parts of the propulsion system 109 in various examples. The user interface 121 may provide information to the worker about destinations 111, items 113, and/or other aspects that may be useful for handling and/or delivery of the items 113.

The interior volume 107 can also include a cargo area 123. The cargo area 123 may be separated from the personnel area 115 by a bulkhead 125. The bulkhead 125 is depicted as including a bulkhead wall 125A with a bulkhead door 125B in a middle area, although any other arrangement of fixed or moveable barriers may be utilized. In some examples, the bulkhead door 125B may provide access through the bulkhead wall 125A between the personnel area 115 and the cargo area 123.

The cargo area 123 may include a storage area 127 (identified respectively as 127A and 127B for different subportions in FIG. 1, although the storage area 127 may correspond to any individual or multiple portions). The storage area 127 can be arranged for storing items 113, such as items associated with the delivery destinations 111. For example, the storage area 127 can include suitable shelves, racks, or other structures for storing items 113 during transport within the delivery vehicle 103. Items 113 may be stored within the storage area 127 during transport from a loading warehouse (or other location at which items may be sorted and/or packed into the vehicle 103 in preparation for delivery) and toward the delivery destinations 111, for example.

The interior volume 107 may at least partially include, be in communication with, and/or be coupled with at least one staging area 129. Some examples of the staging area 129 are identified with differing suffixes in FIG. 1, such as a rear staging area 129A, a front staging area 129B, and a side staging area 129C, although more or less of these or other staging areas 129 may be utilized. The staging area 129 can be divided into and/or include different parts or subdivisions. In some examples, the staging area 129 may be at least partially defined by one or more bins or other staging receptacles.

The staging area 129 may be accessible from within the cargo area 123 as well as from outside the cargo area 123. For example, the staging area 129 may include structure corresponding to a through-path 131. The through-path 131 may provide access from outside the cargo area 123 and into the staging area 129 or vice versa, such as through a door, window, hatch, movable panel, or other barrier or through-hole. For example any item 113 placed in the staging area 129 from within the cargo area 123 may be made accessible from outside the cargo area 123 by accessing the staging area 129 via a through-path 131.

The system 101 may include a dispenser 133. The dispenser 133 can be arranged within the cargo area 123. For example the dispenser 133 may operate within a dispensing area or operating envelope 135 which may be distinct from or overlapping with the storage area 127 and/or the staging area 129. The dispenser 133 may be operable to transfer an item 113 from the storage area 127 and into the staging area 129. For example, the dispenser 133 may be capable of extracting from the storage area 127 and depositing in the staging area 129. Depositing may include dropping, setting, or any other suitable operation for providing an item 113 into the staging area 129. Although some examples of additional structure that may be implemented with respect to the dispenser are discussed with respect to subsequent figures herein, the dispenser 133 may include any suitable structure for performing its functions.

The storage area 127 can include multiple structures and/or areas within the interior volume 107 of the vehicle 103. For example, in the delivery vehicle 103 depicted in FIG. 1, separate storage areas 127 are shown on opposite sides of the dispenser 133 (e.g., with storage areas 127A and 127B respectively behind and in front of the dispenser 133 in the view in FIG. 1, which may also correspond to left and right sides of the dispenser 133). For ease of viewing, a first portion of the storage area 127A-behind the dispenser 133 in the view in FIG. 1—is shown as spanning a full height of an inside of the delivery vehicle 103, while a second portion of the storage area 127B—in front of the dispenser 133 in the view in FIG. 1—is shown as a reduced height relative to the full height of the inside of the vehicle 103, although any combination of similar and/or different height, width, depth, or other size may be utilized. As one illustrative example, a storage area 127A on a driver's side of the vehicle may be wider (e.g., accommodating items stored multiple-deep) and a storage area 127B on a driver's side of the vehicle 103 may be narrower (e.g., accommodating single-deep items), which arrangement may align with an offset of the bulkhead door 125B away from a center of the bulkhead wall 125A as may be present in various models of delivery vehicle 103. In various examples, arranging the storage areas 127 to include portions on both sides of the dispenser 133 may facilitate multi-sided operation of the dispenser 133 in lieu of single-sided operation and/or may be accompanied by components in the dispenser 133 suitable for extracting and/or depositing from either or both sides thereof. In some examples, structure of the storage area 127 may include a mobile base 137 (e.g., skids or casters) that may facilitate loading of structure of the storage area 127 as a whole into the delivery vehicle 103.

Various elements in the system 101 can be controlled by or otherwise interact with a computer system 139. The computer system 139 can include a processor 141, and memory 143 and a communication interface 145. In general, the computer system 139 may function as a controller that controls other components of the system 101, for example, as described further below. Various elements of the system 101 can function as appropriate inputs and/or outputs for the control of the system 101 by the computers system 139.

The illustrated computer system 139 includes a communication interface 145, a processor 141, and a memory 143. The illustrated computer system 139 is also shown with an inventory manager 147, a route manager 149, and a dispensing manager 151. The computer system 139 may represent a single component, multiple components located at a central location within the system 101, or multiple components distributed throughout the system 101. In general, computer system 139 may include any appropriate combination of hardware and/or software suitable to provide the described functionality.

The processor 141 can be operable to execute instructions associated with the functionality provided by computer system 139. The processor 141 may comprise one or more general purpose computers, dedicated microprocessors, or other processing devices capable of communicating electronic information. Examples of the processor 141 include one or more application-specific integrated circuits (ASICs), field programmable gate arrays (FPGAs), digital signal processors (DSPs) and any other suitable specific or general-purpose processors.

The memory 143 can store processor instructions, inventory requests, state information for the various components of system 101 and/or any other appropriate values, parameters, or information utilized by computer system 139 during operation. The memory 143 may represent any collection and arrangement of volatile or nonvolatile, local or remote devices suitable for storing data. Examples of the memory 143 include, but are not limited to, random access memory (RAM) devices, read only memory (ROM) devices, magnetic storage devices, optical storage devices or any other suitable data storage devices.

The communication interface 145 can facilitate communication between the computer system 139 and other components of the system 101, including, but not limited to, information and/or instructions conveyed between any of the dispenser 133, the inventory manager 147, the route manager 149, the dispensing manager 151, and/or other components. These communications may represent communication of any form appropriate based on the capabilities of the computer system 139 and may include any suitable information. Depending on the configuration of the computer system 139, the communication interface 145 may be responsible for facilitating either or both of wired and wireless communication between the computer system 139 and the various components of system 101. In particular embodiments, the computer system 139 may communicate using communication protocols such as 802.11, Bluetooth, or Infrared Data Association (IrDA) standards.

In some embodiments, the communication interface 145 may facilitate communications with backend systems and/or services (e.g., cloud-based or otherwise), such as to retrieve or transmit delivery and item status updates. These and/or other communications managed by the communication interface 145 may be accomplished through communications with and/or through an existing mobile device 158, such as may be carried and/or otherwise associated with a human operator 156 or other operator. Although the mobile device 158 is depicted generally as a smartphone, the mobile device 158 may additionally or alternatively include and/or be in communication with eyewear (e.g., glasses or an eyepiece with augmented reality and/or a heads up display), a watch, a vest or other garment or wearable, and/or any other component suitable for associated functions. The communication interface 145 may provide information to multiple locations, such as to provide consistent user interface signals and/or appearances across devices, e.g., to provide a seamless and consistent experience across all user interface modes. In some embodiments, the communication interface 145 additionally or alternatively may facilitate communications of suitable information to ground or air-based autonomous delivery vehicles that retrieve and deliver dispensed items, such as making up part of an integrated, edge-based delivery fleet.

In general, the inventory manager 147, the route manager 149, the dispensing manager 151, and the communication interface 145 may each represent any appropriate hardware and/or software suitable to provide the described functionality. In addition, as noted above, the computer system 139 may, in particular embodiments, represent multiple different discrete components and any or all of the inventory manager 147, the route manager 149, the dispensing manager 151, and the communication interface 145 may represent components physically separate from the remaining elements of the computer system 139. Moreover, any two or more of the inventory manager 147, the route manager 149, the dispensing manager 151, and the communication interface 145 may share common components. For example, in particular embodiments, the inventory manager 147, the route manager 149, and the dispensing manager 151 represent computer processes executing on the processor 141 and communication interface 145 comprises a wireless transmitter, a wireless receiver, and a related computer process executing on processor 141.

The communication interface 145 can communicate with the user interface 121. In some embodiments, elements of the computer system 139 may be incorporated into and or otherwise communicate with the user interface 121. For example, the computer system 139 may cause the user interface 121 to visually display, auditorily emit, or otherwise provide instructions to an operator regarding handling of items 113 or other tasks associated with operations of the system 101. In some examples, the user interface 121 may permit an operator to input instructions or changes for operations of the system facilitated by the computer system 139.

In operation, the inventory manager 147 may control (e.g., maintain, manage, adjust, and/or process) information about items 113. Such information may include information about identities of items 113, locations of items in storage area 127, and/or information about destinations 111 to which a given item 113 is assigned for delivery.

The route manager 149 can control information about a delivery route. The route manager 149 may use geolocation or sequencing information to track and/or determine information about the route and/or destinations 111 on the routes, for example. Information can include proximity to destinations 111, including spatial distance as it changes during navigation and operation of the delivery vehicle 103 relative to the delivery destinations 111. The route manager 149, for example, may track how close a destination 111 is to the current location of the vehicle 103. The proximity of the vehicle 103 relative to a destination 111 may include information about physical distance and/or information about sequencing, such as if a destination is first, second, third, or other sequencing interval within the sequence of the route.

The dispensing manager 151 may control information about and/or operation of the dispenser 133. The dispensing manager 151 may utilize information from the inventory manager 147 and/or the route manager 149. For example, based on a proximity to a destination 111 from the route manager 149, the dispensing manager 151 may operate to retrieve an item 113 based on information from the inventory manager 147 about a location of the item 113 within the storage area 127 and in view of the item 113 being assigned to a particular destination 114 delivery.

As an illustrative example, the computer system 139 may perform operations that may include: accessing route information (e.g. from the route manager 149) that includes information about proximity to a designated delivery destination 111 along the route; accessing item information (e.g., from the inventory manager 147) that includes information about an assigned item 113 that is assigned for the designated delivery destination 111; and cause the dispenser (e.g., under control of the dispensing manager 151) to move the assigned item 113 as a selected item 113 from the storage area 127 and to the staging area 129 so as to make the assigned item 113 accessible from outside the cargo area 123 in response to the proximity to the designated delivery destination 111. Making the item 113 accessible in view of the proximity information may allow the driver or other operator associated with the vehicle 103 to readily access an item 113 for delivery, for example, without resorting to additional steps by the operator to enter the cargo area 123 to perform operations such as sorting, retrieving, extracting, etc. Although in some examples, the operator may correspond to a human operator 156, the system 101 may additionally or alternatively communicate with, instruct, and/or interact with an aerial drone 152, a ground-traversing drone 154, an aquatic drone, a humanoid robot, and/or any other robotic and/or automated operators.

As a further illustrative example, the system 101 may queue items 113 based on the information from the route manager 149 and the inventory manager 147 to more readily facilitate delivery to destinations 111 by the operator or operators. For example, the system 101 may use the dispenser 133 to move a first item 113 to a first part of the staging area 129A (e.g., accessible through a rear door or wall 130A of the vehicle 103), a second item 113 to a second part of the staging area 129B (e.g., accessible through a front door or wall 130B of the vehicle 103, which may correspond to a portion of the bulkhead 125, for example), and a third item 113 to a third part of the staging area 129C (e.g., accessible through a side door or wall 130B of the vehicle 103). The system 101 may further provide information about each staging area 129 (e.g., on the user interface 121) such that a suitable operator is instructed to access the first item 113 from the first staging area 129A for delivery to the first destination 111A (such as depicted by dotted line 153A), to access the second item 113 from the second staging area 129B for delivery to the second destination 111B (such as depicted by dotted line 153B), and to access the third item 113 from the third staging area 129C for delivery to the third destination 111C (such as depicted by dotted line 153C). Although different operators (e.g., an aerial drone 152, a ground drone 154, and a human operator 156) are shown for each of the dotted lines 153A, 153B, and 153C in FIG. 1, the same or different operators may be assigned to access differing staging areas 129.

In some embodiments, a light indicator 150 may be illuminated at a particular staging area 129 to indicate the association of that staging area 129 with an item to be delivered to a particular destination 111. For example, this may serve to remind and guide an operator to the correct location to access. Other forms of indicator may be utilized additionally or alternatively, including, but not limited to, speakers or other auditory or visual indicators.

In some embodiments, the system 101 may also enable other functions. As one example, the system 101 may be capable of receiving items (such as customer pickups) during the route. For example, items from outside the cargo area 123 may be retrieved and introduced into a staging area 123 and/or otherwise be loaded for receipt and/or storage within the cargo area 123.

Figure 2:
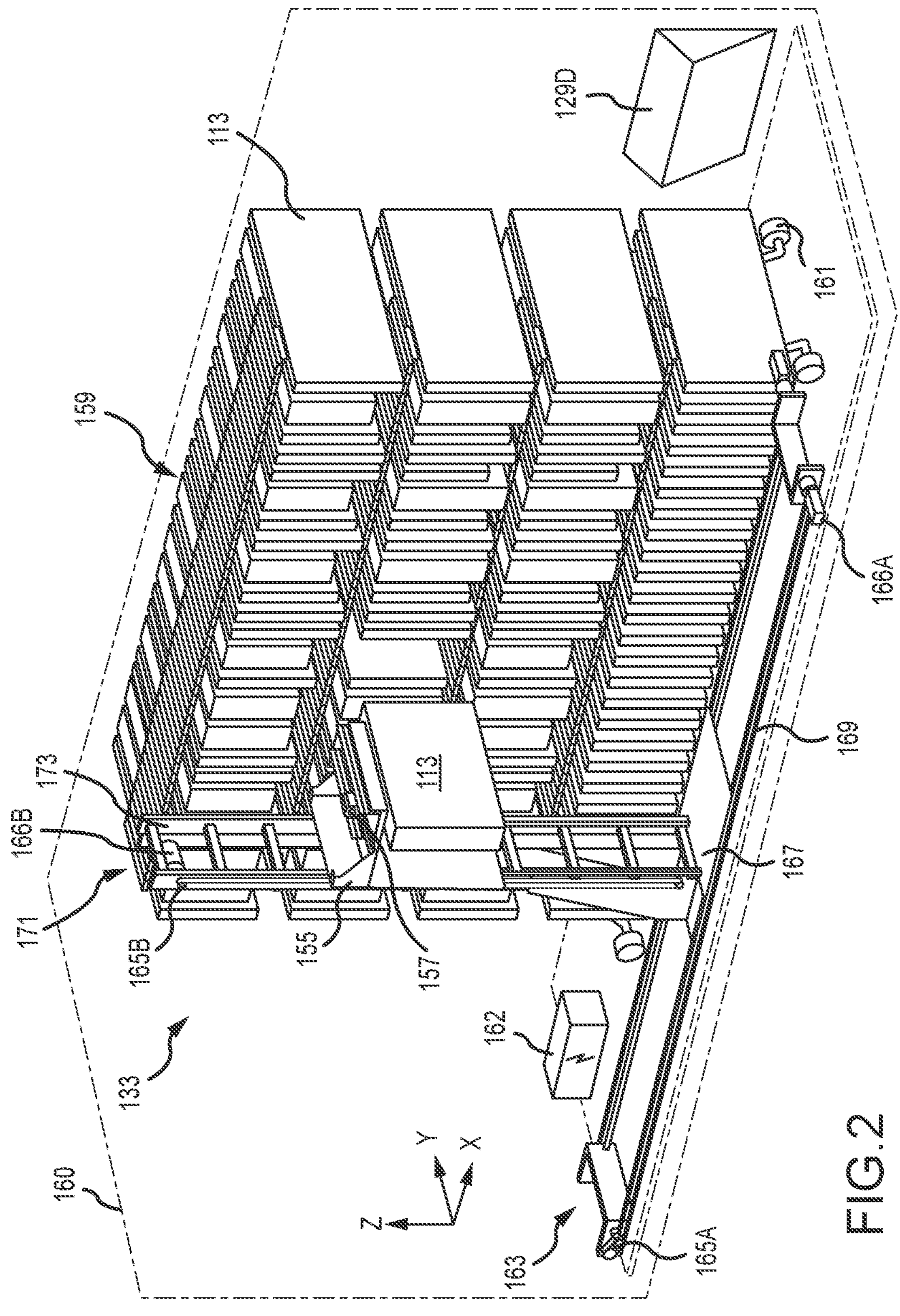
FIG. 2 illustrates components that may be used within and/or along with a dispenser that may be utilized in the system of FIG. 1 in accordance with various embodiments.

FIG. 2 illustrates components that may be used within and/or along with a dispenser 133. The dispenser 133 can include a carriage 155 and an end effector 157. The carriage 155 may be movable to reposition the end effector 157 so as to position the end effector 157 in a suitable location for accessing an item 113 within a storage rack 159. For example, the end effector 157 may be capable of retrieving the item 113 from the storage rack 159 and/or loading the item 113 into the storage rack 159. Additionally or alternatively, the carriage 155 may be movable to reposition the end effector 157 so as to position the end effector 157 in a suitable location for dispensing the item 113 into a staging area 129D (e.g., which may be an example of a staging area 129A, 129B, 129C or other structure or position of a staging area 129) and/or other suitable location.

The storage rack 159 may correspond to any combination of shelves, rails, or other members that may be suitable for containing, supporting, organizing, or otherwise storing items 113 in use. Some examples of suitable structure are described further with respect to later figures herein.

At least some elements may be implemented relative to an enclosure 160. The enclosure 160 may correspond to a sea cannister, shipping container, stand-alone compartment, walled volume, or other structure that may be transferred among settings and/or implemented relative to other vehicles and/or structures. As one example, the enclosure 160 may correspond to a unit that can be readily installed to retrofit a flatbed truck or other chassis or structure. The enclosure 160 may be configured for permanent or reversible installation, for example. In some embodiments, the enclosure 160 may correspond to a unit that can be delivered to a particular location, such as to serve as a locker or other stationary unit that can accomplish associated functions. In some embodiments, the enclosure 160 may correspond at least in part to the walls of a delivery vehicle 103. At least some part of the rack 159, the dispenser 133, the staging area 129D, and/or other elements may be suitably mounted or secured relative to one or more walls, floors, ceilings, or other infrastructure of the enclosure 160, e.g., to facilitate stability during transport. In some embodiments, the enclosure 160 may be equipped with a battery pack, fuel cell, or other power source 162, e.g., which may provide standalone power for components in the enclosure 160 and/or provide an interface through which power can be received and/or provided relative to a power and/or charging system of the delivery vehicle 103 or other structure with which the enclosure 160 is coupled.

The rack 159 is shown in FIG. 2 with a mobile base 161. The mobile base 161 may be an example of the mobile base 137 described above and/or may correspond to wheels, casters, skids, and/or any other structure that may facilitate movement of the rack 159 between different locations. The mobile base 161 may facilitate loading of the rack 159 into or out of a delivery vehicle 103 or enclosure 160. In some examples, the rack 159 can be loaded within a warehouse and then loaded into delivery vehicle 103 or enclosure 160 for access during delivery operations related to a route. The dispenser 133 similarly may include components designed to be readily removed and/or installed relative a delivery vehicle 103 and/or enclosure 160, such as to facilitate maintenance and/or accommodate peak operations or other conditions in which it may be advantageous to retrofit to a fully manual or other mode of operation that does not utilize the dispenser 133 and/or other elements.

The dispenser 133 may be utilized relative to a rack 159 within a delivery vehicle 103, an enclosure 160, and/or within a warehouse environment. For example the dispenser 133 may be operational to extract items 113 from the rack 159 and/or to insert or install items into the rack 159. In various examples, the dispenser 133 can thereby load or unload the rack 159 and may be suitable for use in a mobile context (such as in a delivery vehicle 103 or an enclosure 160) and/or in stationary context (such as in a fulfillment center or other warehouse environment) in which the rack 159 may be employed for loading or populating prior to installation in a delivery vehicle 103 or other mobile context for use.

The dispenser 133 can include any suitable structure for movement of the carriage 155. In the example depicted in FIG. 2, the dispenser 133 can include a longitudinal positioner 163 that may be suitable for adjusting a position of the carriage 155 along a longitudinal axis X. The longitudinal positioner 163 is shown having a series of driven belts 165A which can be moved by a motor 166A or otherwise suitably advanced to move a gantry base 167 along tracks 169, although any other suitable structure may be utilized to control and/or effectuate longitudinal position along the longitudinal axis X.

The dispenser 133 can further include a vertical positioner 171. The vertical positioner 171 is shown with a further set of belts 165B driven by a further motor 166B along a tower

173, although the vertical positioner 171 can include any other suitable structure for adjusting a position of the carriage along a vertical axis Z.

The end effector 157 may be operable along a transverse direction Y, for example, to insert or extract items 113 relative to the rack 159. Some examples of the end effector 157 are described with respect to later figures herein, although any suitable structure may be utilized. Moreover, although the longitudinal positioner 163, the vertical positioner 171, and the end effector 157 have been described as separate elements that control operation in different respective directions, it may be appreciated that any suitable combination of components may be utilized to provide movement along any one or more relevant directions. It may also be appreciated that any of the structure of the dispenser 133 described herein can be positioned within the dispensing area or operating envelope 135 described above with respect to FIG. 1.

Figure 3:
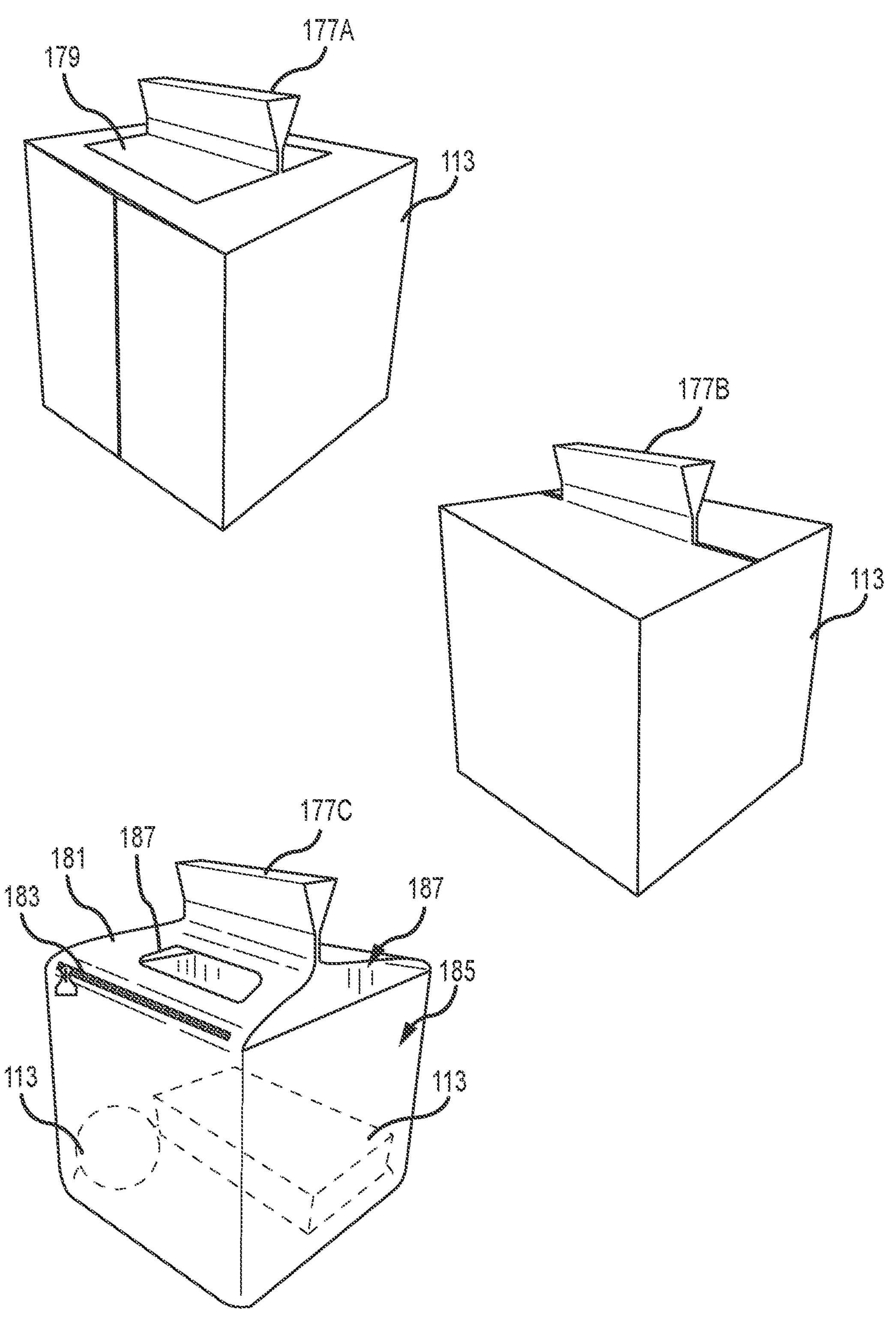
FIG. 3 illustrates some examples of item handles that may be utilized in the system of FIG. 1 in accordance with various embodiments.

FIG. 3 illustrates some examples of item handles 177 that may be utilized in association with other components of the system 101 herein. Three examples of item handles 177 are shown in FIG. 3 and denoted as 177A, 177B, and 177C. The item handle 177 can include any suitable structure to facilitate hanging or holding items 113 in use. In various examples, the item handles 177 may be utilized to facilitate the item 113 being suspended from structure of the storage rack 159.

The first example (e.g., depicted in the upper left of FIG. 3) includes an item handle 177A attached as a separately attachable assembly 179. For example, the separately attachable assembly 179 may be coupled with packaging of the item 113 by a suitable adhesive or one or more straps that may be engaged to connect the item handle 177A with the item 113.

The second example (e.g., depicted in a middle portion of FIG. 3) includes an item handle 177B formed as an integral part of packaging of the item 113. For example, this may correspond to the item 113 being formed with packaging made of corrugate or other packaging material that is formed with extensions that are foldable or manipulable to form the handle 177B in use. The handle 177B may be captured within closing flaps of the item 113 and/or otherwise retained in place when the packaging is completed, for example.

The third example (e.g., depicted in the bottom portion of FIG. 3) includes an item handle 177C that may be included in a carrier 181. The carrier 181 may be sized and arranged for receipt and retention of other items 113 therein. For example, the carrier 181 may include a zipper or other closure that may provide access into an interior volume 185 of the carrier 181 into which may be introduced one or more items 113 (e.g., of like or different sizes, weights, types, etc.). The carrier 181 can include any form factor, notwithstanding the cubelike depiction in FIG. 3. The carrier 181 can contain items 113 in use. The separate carrier 181 may be advantageous in being reusable to permit the carrier 181 to be opened by a door and/or other structure and/or at least partially disassembled to permit the items 113 to be inserted and/or removed for delivery in use. The carrier 181 may additionally or alternatively include one or more apertures or openings 187 through which one or more items 113 may be inserted and/or removed relative to the carrier 181. In an illustrative example, an operator may remove a carrier 181 from the vehicle 103 and/or remove an item 113 from the carrier 181 and return the carrier 181 to the vehicle to reduce the amount of packaging ultimately used for delivery of the item 113 to the destination 111. For example, the handle 177 and/or other features of the carrier 181 may be sized and arranged to facilitate manipulation by robotic arms, aerial drones, ground drones, aquatic drones, humanoid robots, and/or other autonomous delivery systems.

Figure 4:
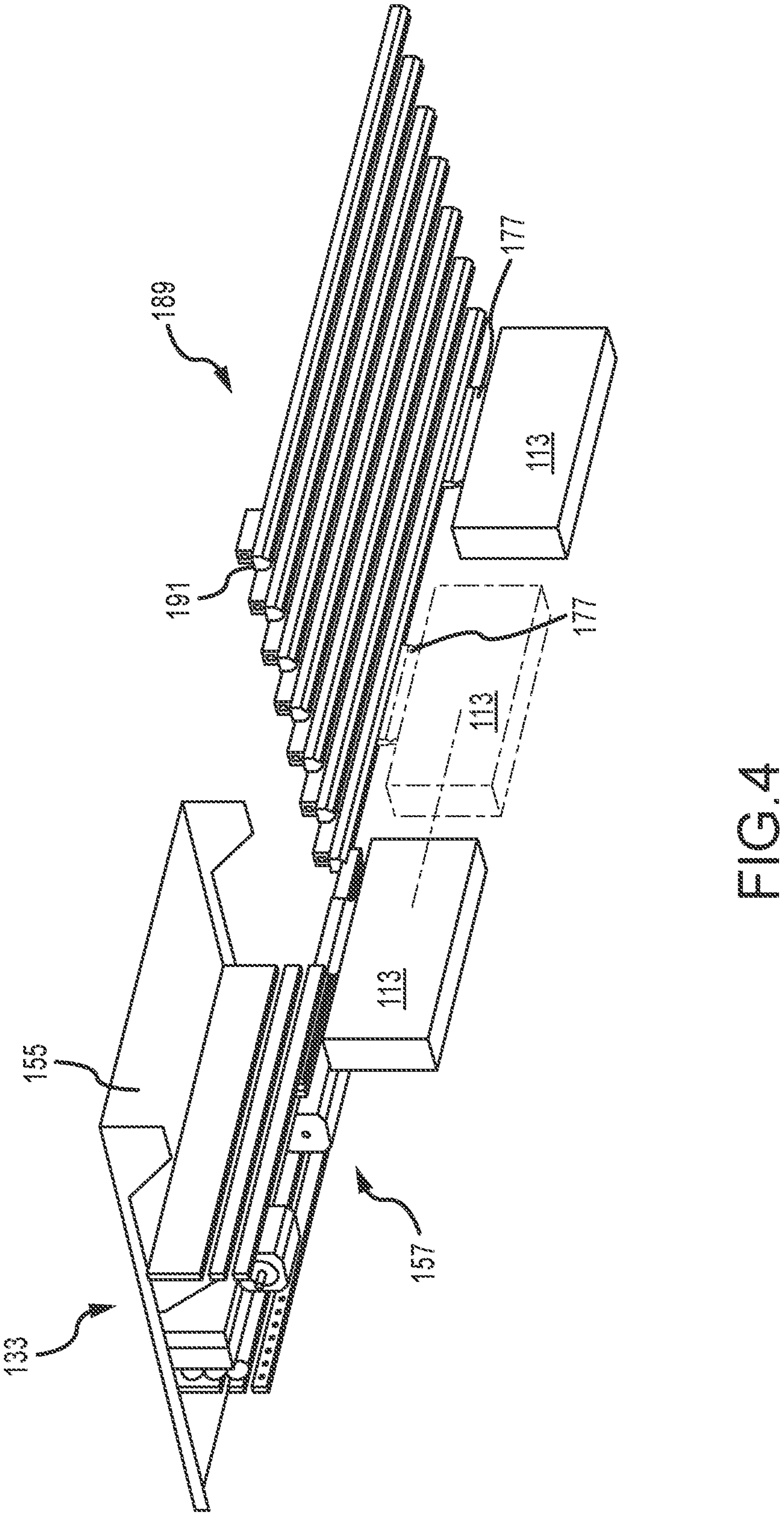
FIG. 4 illustrates an example of an array of storage channels that may be utilized in the system of FIG. 1 in accordance with various embodiments.

FIG. 4 illustrates an example of an array 189 of channels 191 (which may be storage channels) that may be utilized for managing of items 113 with respect to other structure described herein. Generally, in use, the carriage 155 of the dispenser 133 can position the end effector 157 at a suitable location for interaction with the channels 191. Once positioned, the end effector 157 may facilitate or effectuate movement of items 113 from the respective states of being received by the channel 191 or being received by the end effector 157, for example.

In various examples at least two item handles 177 can be received along the length of a respective channel 191. An illustrative example is shown in FIG. 4, where one item 113 is shown in solid lines at right along a channel 191 while a second item 113 is shown in phantom lines at left along the channel 191. The position in phantom lines may correspond to a position of being readily accessible for transfer to or from a position shown in solid lines of being received by the end effector 157. Additional examples of structure that may be utilized with the channels 191 are described in further figures herein.

Figure 5:
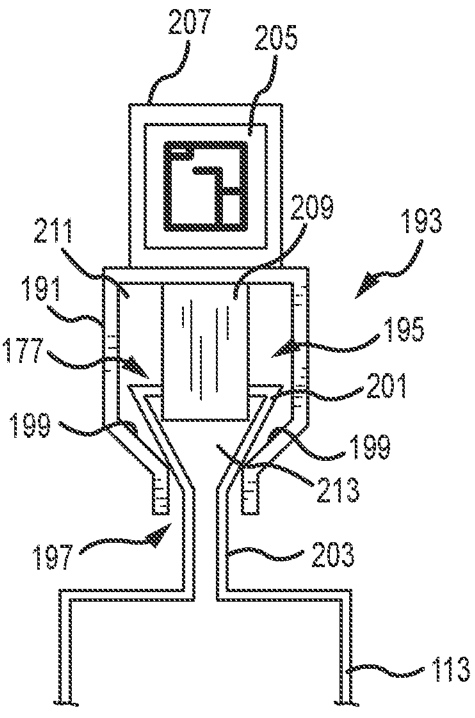
FIG. 5 shows an end view of a storage channel that may be utilized within the array of FIG. 4 in accordance with various embodiments.

FIG. 5 shows an end view of a channel 191 that may be utilized. The channel 191 is shown as formed within an individual rail that individually defines the channel 191, although features of the channel 191 may be formed by removal of material from a block or other structure (e.g., such that one or more channels 191 may be defined within a singular base structure.

The channel 191 can have a channel wall set 193 of one or more channel walls. In the view in FIG. 5, the channel wall set 193 includes channel walls extending along a length of the channel 191 (e.g., in a direction into and/or out of the page). The channel wall set 193 may be arranged bounding a channel internal volume 195. The channel wall set 193 can define a channel mouth 197 that extends along the length of the channel 191 and through which the channel internal volume 195 is accessible.

The channel wall set 193 may further include internal ledges 199. The internal ledges 199 may extend away from the channel mouth 197. The ledges 199 can be arranged for supporting an item handle 177. For example, the ledges 199 may support the item handle 177 in a docked position in which a first portion (e.g., a cap 201) of the item handle 177 is supported by the internal ledges 199. A second portion (e.g., a stem 203) of the item handle 177 may extend through the channel mouth 197 as a hanging support.

Although in FIG. 5, the channel wall set 193 is shown by way of example as a set of seven segments or walls that make a generally pentagonal shape with flanges extending from an opening to form a downward tip along the channel mouth 197, the channel wall set 193 may correspond to a singular circular wall defining a downward opening and/or may correspond to any other suitable arrangement and/or geometry of the channel wall set 193 suitable for engagement with the handle 177 and/or other described functions.

The channel 191 may include, interact with, and/or be accompanied by other features that may facilitate handling of items 113 relative to the channel 191. As one example, a machine-readable indicium 205 may be included. The machine-readable indicium 205 may correspond to any kind of optically readable number, code, symbol, etc. Although the machine-readable indicium 205 is shown positioned at a top of the channel 191, placement may be in any position suitable for facilitating identification of the channel 191. The machine-readable indicium 205 may be on a housing 207 associated with the channel 191.

In various examples, the channel 191 may be associated with a lock 209. For example, the lock 209 may be positionable to block a movement of a part of the item handle 177 (such as the cap 201). The lock 209 may prevent the cap 201 or other part of the item handle 177 from exiting out through an end opening 211 of the channel 191, for example. The lock 209 may be actuatable to move out of a path of obstructing the item handle 177 and into a position permitting passage of the item handle 177 in or out through the end opening 211 of the channel 191 (e.g., in the direction into or out of the page) to facilitate movement of the item 113 for insertion or extraction relative to the channel 191.

The handle 177 may include features to facilitate engagement with other features of the system 101. As previously noted examples, in use, the cap 201 of the handle 177 may engage the ledges 199 of the channel 191 while the stem 203 of the handle 177 may extend through the mouth 197 of the channel 191. As a further example, the handle 177 may include an end passage 213. The end passage 213 may be suitably sized to permit insertion and/or engagement of at least a portion of the end effector 157, such as described in greater detail with respect to FIGS. 6A-6E.

FIGS. 6A-6E depict a series of states of components for effectuating item transfer relative to a channel 191 in accordance with various embodiments.

Figure 6A:
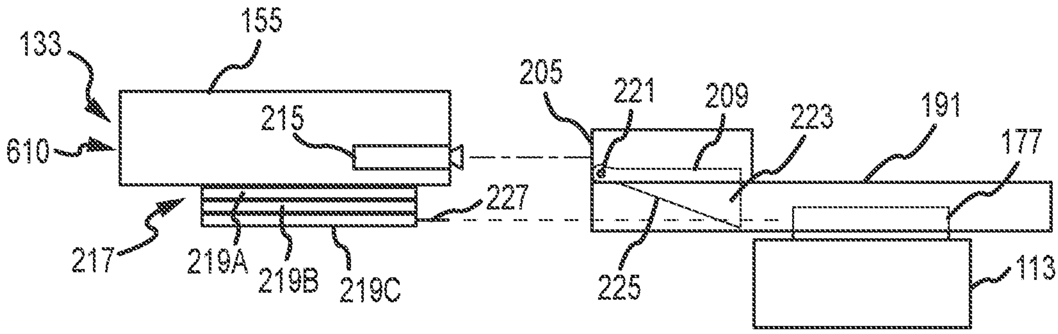
FIGS. 6A-6E depict a series of states of components for effectuating item transfer relative to a storage channel of FIG. 5 in accordance with various embodiments.

At 610 in FIG. 6A, an aligned state is shown with several components, such as the carriage 155, a sensor 215, and an arm 217 (e.g., which may form at least a portion of the end effector 157, for example).

The sensor 215 may be an optical sensor that may be capable of detecting the machine-readable indicium 205 or any other suitable form of sensor for determining alignment relative to the channel 191. Although shown mounted on the carriage 155 in FIG. 6A, the sensor 215 may be located on the carriage 255, on the end effector 157, or any other suitable location (which may include, but is not limited to arrangements in which the sensor 215 is on the channel 191 and the machine-readable indicium 205 is on the carriage 255, end effector 157 or other suitable location). Although primarily described with respect to an optical sensor detecting visually identifiable indicium, any other locating system that may use triangulation or any other form of suitable alignment techniques may be implemented. In use, the carriage 155 may be aligned based on information from the sensor 215 (e.g., about a location of the machine-readable indicium 205), which may align the arm 217 for suitable engagement with the channel 191 and/or item 113. For example, as depicted respectively by the dot-dashed line and dashed line in FIG. 6A, alignment of the sensor 215 with the machine-readable indicium 205 may coincide with or match with alignment of the arm 217 with the channel 191 and/or the item 113.

The arm 217 can be retractable and extendable. The arm 217 may include multiple segments 219. For example, the arm is shown with three segments 219A, 219B, and 219C, although any suitable number of segments 219 may be utilized. The segments 219 may be movable relative to one another to permit telescoping extension and retraction, for example. In some embodiments, the segments 219 and/or other structure of the arm 217 may be arranged to enable the dispenser 133 to extend and/or retract on either or both sides (e.g., a left side and a right side) to retrieve and/or place items on either or both sides thereof. For example, although the dispenser 133 is depicted with the segments 219 being operational to move relative to an item 113 arranged to the right in the view of FIGS. 6A-6E, the segments 219 additionally or alternatively may be capable of bidirectional movement and/or capable of other suitable operation relative to a left side of the view in FIGS. 6A-6E.

Turning to the righthand portion of FIG. 6A, the lock 209 may be mounted by a pivot 221. The lock 209 can include a barrier surface 223. The barrier surface 223 can be positioned so that the lock 209 in a locked position will prevent movement of the item handle 177 for inadvertent exiting of the channel 191 due to jostling or vibrations during transport within the vehicle 103. The lock 209 can include a ramped surface 225, e.g., at least partially between the pivot 221 and the barrier surface 223. The ramped surface 225 may be suitable for moving the lock 209 out of a locked position, such as described further below.

The item 113 is shown coupled with a handle 177 that is received within the channel 191 to support the item 113 relative to the channel 191. The handle 177 may be arranged suitably to facilitate engagement with the arm 217, for example. The arm 217 may further include a hook 227, e.g., which may be actuated for engagement with the item handle 177, such as described in greater detail below.

Figure 6B:
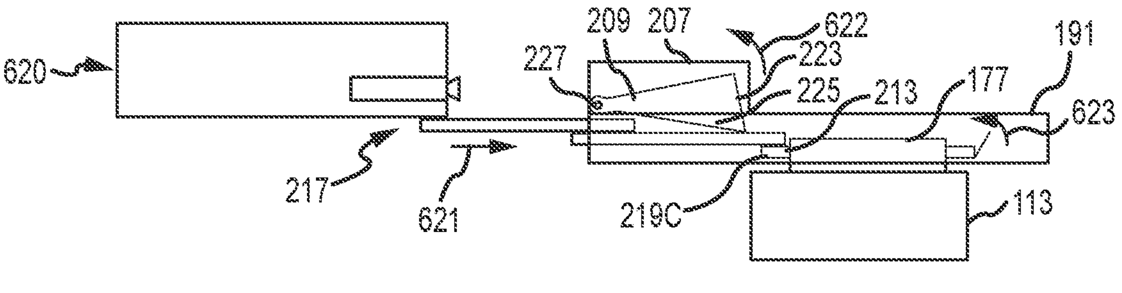

At 620 in FIG. 6B, a state is shown in which the arm 217 has been extended for engagement with the item handle 177. Upon suitable alignment, the arm 217 may extend (e.g., away from the state 610 of FIG. 6A and toward the state 620 of FIG. 6B). The arm 217 may extend, such as depicted by arrow 621. The extension of the arm 217 may cause a portion to engage the lock 209 (e.g., along the ramped surface 225) and cause the lock 209 to move (such as depicted by arrow 622, e.g. rotating about the pivot 221). Movement of the lock 209 may include moving of the lock 209 into the housing 207, for example. The rotation of or displacement of the lock 209 can move the barrier surface 223 out of a position of blocking the handle 177 and enable the handle 177 to move along the channel 191.

Extension of the arm 217 may arrange the arm 217 at least partially extending through the handle 177. For example, the segment 219C of the arm 217 may extend through the end passage 213 of the item handle 177.

Extension of the arm 217 may also suitably position the hook 227 for actuating (such as shown at arrow 623) into a suitable position for engaging the handle 177 of the item 113. Actuating the hook 227 may facilitate extraction of the item handle 177 and item 113 relative to the channel 191, e.g. toward the position shown at 630 in FIG. 6C.

Figure 6C:
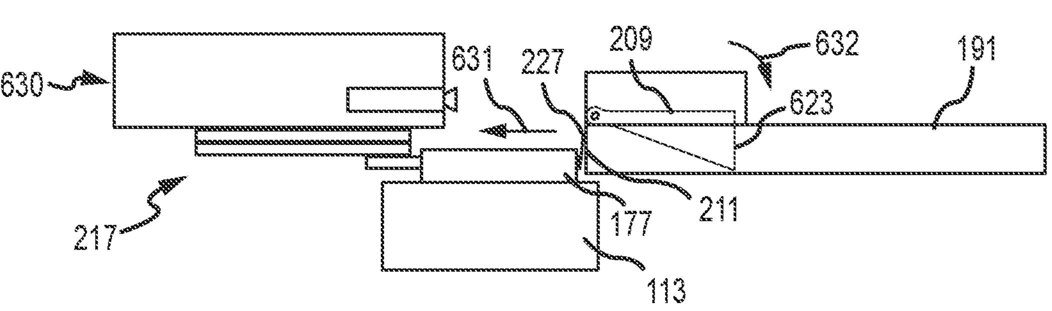

At 630 in FIG. 6C, the arm 217 has been at least partially retracted and has pulled the item handle 177 out of the channel 191. The retraction may be represented by arrow 631. For example, this may correspond to pulling the item handle 177 through the end opening 211 of the channel 191. Engagement of the item handle 177 with the hook 227 may cause the item handle 177 to be pulled onto the arm 217.

Upon removal of the item 113 from the channel 191, the lock 209 may pivot and/or move (e.g., such as depicted by arrow 632) into place. For example, the lock 209 may move such that the barrier surface 223 can be positioned for blocking inadvertent exit of any other object received within the channel 191.

Figure 6D:
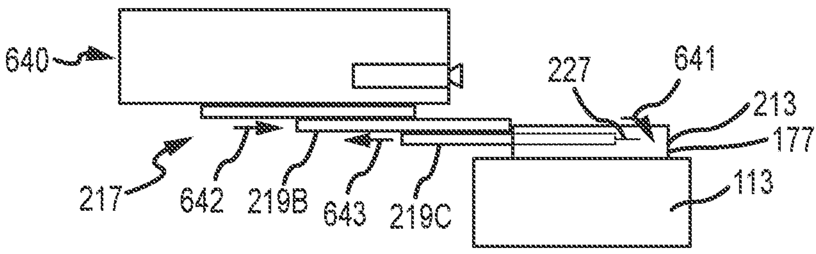

The item 113 can be maintained in engagement with the arm 217 until reaching a suitable unloading location and/or until ready to perform unloading actions (e.g., such as those described with respect to FIG. 6D.)

At 640 in FIG. 6D, a state is shown in which segments of the arm 217 have begun to move in a process en route toward releasing the item 113. The hook 227 can be actuated (e.g., such as depicted by arrow 641) to a position in which the hook can move through the end passage 213 of the handle 177. Relative motion between segments 219 of the arm 217 (such as between segments 219B and 219C) can facilitate unloading of the item 113. For example, the segment 219B can move leftward (as depicted by arrow 642) and/or the segment 219C can move rightward (as depicted by arrow 643). Relative motion between the segments can cause a portion of the segment 219B to engage the handle 177 (e.g., above the end passage 213). Contact between the segment 219B and the handle 177 can either push the handle 177 or retain the handle 177 in position while the lower segment 219C is extracted from within the end passage 213 of the handle 177. Continued relative motion between the segments 219 of the arm 217 can permit full unloading of the item 113, such as toward a position shown at 650 in FIG. 6E.

Figure 6E:
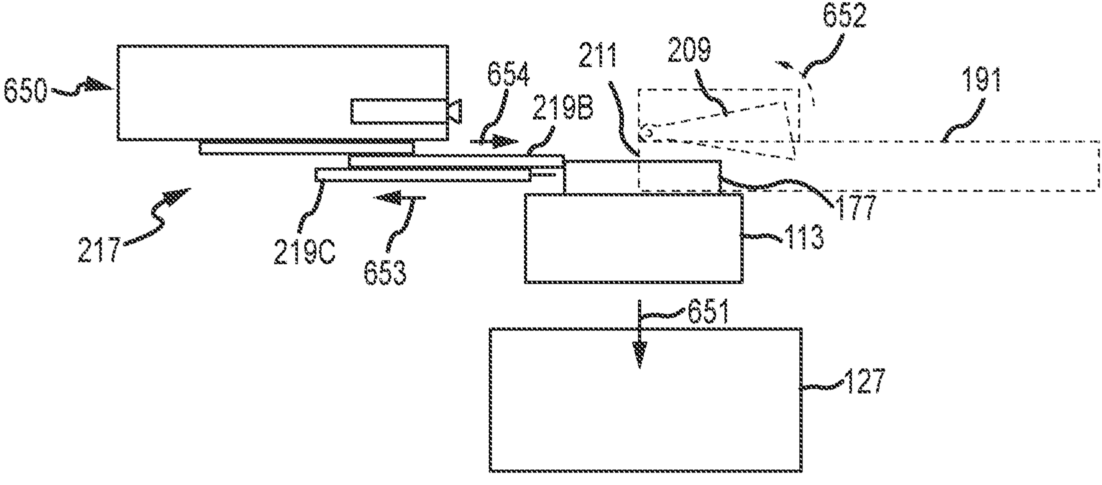

As depicted at 650 in FIG. 6E, the item 113 can be transferred from the arm 217. The transferring may include depositing into a bin or storage area 127 (such as depicted by arrow 651). Alternatively, the transferring may include depositing onto a different channel 191 (such as through the end opening 211 of the channel 191 and with suitable relative motion to cause movement of the lock 209 (as depicted at arrow 652) for permitting the handle 177 to be engaged within the channel 191). Suitable movement for transferring the item 113 from engagement with the arm 217 can be effectuated by ongoing relative motion of segments 219 of the arm 217. For example, suitable relative motion may be accomplished by continued leftward motion of segment 219C (such as depicted by arrow 653) and/or by ongoing rightward motion of the segment 219B (as depicted by arrow 654). In this fashion, the arm 217 can move the item 113 into and/or out of a docked position relative to the channel 191 and/or into or out of a bin or other storage area 127.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A delivery van, comprising:

a vehicle body defining a personnel area and a cargo area separated from the personnel area;

a propulsion system coupled with the vehicle body and operable to move the vehicle body among varying delivery destinations along a route;

a storage area within the cargo area and within which is disposed an array of channels each having a downwardly facing channel mouth;

a plurality of items associated with the delivery destinations, each item suspended by an item handle having an upper portion supported by a respective one of the channels, the item handle further having a lower portion extending through the channel mouth;

a staging area accessible from inside the cargo area and from outside the cargo area;

a dispenser arranged within the cargo area and operable for item transfer from the storage area to the staging area, the dispenser comprising a carriage moveable for selective alignment relative to the array of channels, the dispenser further comprising an extendable and retractable arm supported by the carriage; and a controller comprising a processor and a non-transitory computer-readable medium comprising processor-executable instructions to cause the processor to:

access route information that includes information about proximity to a designated delivery destination along the route;

access item information that includes information about an assigned item that is assigned for the designated delivery destination;

cause the dispenser to align the carriage with a channel supporting the assigned item and to extend and retract the arm so as to move the assigned item from the storage area onto the arm; and cause the dispenser to align with the staging area and to operate the arm to move the assigned item from the arm to the staging area, thereby making the assigned item accessible from outside the cargo area in response to the proximity to the designated delivery destination.

2. The delivery van of claim 1, wherein the plurality of items are arranged so that at least some of the array of channels include two item handles received within a length of an included channel.

3. The delivery van of claim 1, further comprising:

machine readable indicium associated with the array of channels; and an optical sensor mounted on the carriage and operable to detect the indicium for facilitating alignment of the carriage.

4. The delivery van of claim 1, wherein at least one channel of the array of channels includes at least one of:

a lock pivotable to block a received item handle from exiting the channel; or walls defining internal ledges that extend away from the channel mouth and are arranged for supporting a received item handle in a docked position in which a portion of the item handle is supported by the internal ledges and a portion of the item handle extends through the channel mouth as a hanging support.

5. A delivery system, comprising:

a body defining boundaries around an interior volume;

a cargo area defined within the interior volume and including a storage area arranged for storing items associated with varying delivery destinations along a route, wherein the storage area comprises an array of channels each having a downwardly facing channel mouth, and wherein a plurality of item handles are disposed within the array of channels such that each respective item handle has an upper portion supported by a respective channel of the array and has a lower portion extending through a respective channel mouth of the array;

a staging area;

a dispenser arranged within the cargo area and operable to transfer a selected item from the storage area and to the staging area; and a controller comprising a processor and a non-transitory computer-readable medium comprising processor-executable instructions to cause the processor to:

access route information that includes information about proximity to a designated delivery destination along the route;

access item information that includes information about an assigned item that is assigned for the designated delivery destination; and cause the dispenser to move the assigned item as the selected item from the storage area to the staging area so as to make the assigned item accessible in the staging area in response to the proximity to the designated delivery destination.

6. The system of claim 5, wherein the staging area is accessible from outside the cargo area.

7. The system of claim 5, wherein the dispenser is configured to extract the selected item from the storage area and to deposit the selected item into the staging area.

8. The system of claim 5, wherein the staging area is arranged to be accessible through a side wall of the body, a front wall of the body, a door through the body, through a bulkhead wall separating the cargo area from a personnel area, or through a rear wall of the body.

9. The system of claim 5, wherein the body comprises multiple staging areas, and wherein the instructions further cause the processor to provide an indication of which of the multiple staging areas includes one or more items assigned for a particular delivery destination.

10. The system of claim 5, wherein the staging area comprises a staging receptacle.

11. The system of claim 5, wherein:

the body comprises a vehicle body that further defines a personnel area separated from the cargo area;

the system further comprises a propulsion system coupled with the vehicle body and operable to move the vehicle body among the varying delivery destinations along the route;

the dispenser includes a moveable carriage and an arm supported by the carriage; and the dispenser moving the assigned item from the storage area to the staging area includes moving the carriage to align with a particular channel, moving the assigned item from the particular channel to the arm, and moving the assigned item from the arm to the staging area.

* * * * *